United States Patent [19]
Ferguson

[11] 3,811,255
[45] May 21, 1974

[54] CROSS-FLOW MOWER WITH CANTED REEL AND THREE-WHEEL SUSPENSION

[75] Inventor: Hugo S. Ferguson, Averill Park, N.Y.

[73] Assignee: Reel Vortex, Inc., Poestenkill, N.Y.

[22] Filed: June 30, 1972

[21] Appl. No.: 268,072

Related U.S. Application Data

[63] Continuation-in-part of Ser. No. 783,192, Dec. 12, 1968, Pat. No. 3,673,773.

[52] U.S. Cl.................... 56/13.3, 56/249, 56/294
[51] Int. Cl............................................ A01d 55/20
[58] Field of Search ............ 56/13.3, 13.4, 249, 294

[56] References Cited
UNITED STATES PATENTS
3,673,773   7/1972   Ferguson ........................... 56/13.3
2,638,729   5/1953   Bourg ................................. 56/249

Primary Examiner—Antonio F. Guida
Attorney, Agent, or Firm—Pennie & Edmonds

[57] ABSTRACT

In a lawn mower of the cross-flow blower type, employing a cylindrical reel with helically curved cutting blades in a blower conduit, the reel and adjacent portions of the conduit are mounted with the reel axis canted in the horizontal plane at an angle with respect to a perpendicular to the normal direction of travel of the mower which is approximately equal to the helix angle of the blades and in a direction such that tangents to the helix of the blades in the lowermost positions thereof are approximately perpendicular to the normal direction of travel of the mower. The mower carriage is provided with three wheels, one of which is mounted behind the rearward end of the canted reel and at least partially laterally inside the lateral position of the rearward end of the reel. The other two wheels are mounted in forward and rearward positions on the other side of the carriage.

6 Claims, 3 Drawing Figures

CROSS-FLOW MOWER WITH CANTED REEL AND THREE-WHEEL SUSPENSION

RELATED APPLICATION

This application is a continuation-in-part of application Ser. No. 783,192 filed Dec. 12, 1968, now U.S. Pat. No. 3,673,773, issued July 4, 1972.

BACKGROUND OF THE INVENTION

In the above-identified application a cross-flow mower is described comprising a cylindrical reel having a plurality of circumferentially-spaced cutting blades and a blower conduit cooperating therewith to form a cross-flow blower. The inlet region of the blower opens downwardly with a portion of the reel therein exposed to material to be mowed, and the reel is driven in a rotational direction such that the lower blades move in the normally forward direction of travel of the mower. The cross-flow blower action causes air to flow into at least the lower portion of the inlet region from in front of the mower with a substantial component of velocity tangential to the reel and opposite to the direction of movement of the blades. This enables effective mowing of both short and tall grass, weeds, etc., without the employment of a fixed blade or bed knife in shearing relationship with the reel blades. It is preferred to use helically-curved blades to reduce blower noise, and for other reasons set forth therein.

It has now been found that with helically-curved blades the direction of air flow at the blades, when in their lowermost position where the final cut is made, is substantially perpendicular to a tangent to the helix of the blades, and hence at an angle with respect to the normal direction of travel of the mower. While satisfactory mowing is obtainable with the mowers described in the aforesaid application, it is believed that somewhat superior operation can be obtained if the air flow at the blades in their lowermost position is parallel and opposite to the normal direction of travel of the mower.

SUMMARY OF THE INVENTION

In accordance with the present invention, the reel of a mower of the cross-flow blower type having helically-curved cutting blades, and adjacent portions of the blower conduit, are canted in the horizontal plane at an angle with respect to a perpendicular to the normal direction of travel of the mower which is approximately equal to the helix angle of the blades, and in a direction such that tangents to the helix of the blades in the lowermost positions thereof are approximately perpendicular to the normal direction of travel of the mower. With this arrangement, air flow in the input region is approximately perpendicular to the blades at their lowermost positions so as to force the grass directly against the blades, rather than at an angle thereto, when the final cut is made.

In accordance with a further aspect of the invention, a three-wheel suspension for the carriage is employed. One wheel is mounted on one side of the carriage behind the rearward end of the canted reel and at least partially laterally inside the lateral position of the rearward end of the reel. This permits mowing close to walls and other obstacles on that side of the reel without interfering with the cross-flow cutting action of the reel on that side. On the other side of the carriage, two wheels are mounted in forward and rearward positions to provide a stable suspension for the carriage.

Advantageously the single wheel on one side of the carriage and the forward wheel on the other side are mounted so that a line extending between the centers of the wheels crosses the reel axis near the center thereof as viewed from the top of the mower. This promotes fairly even mowing of the grass when passing over somewhat uneven ground.

DESCRIPTION OF THE SPECIFIC EMBODIMENT

Figure 1:
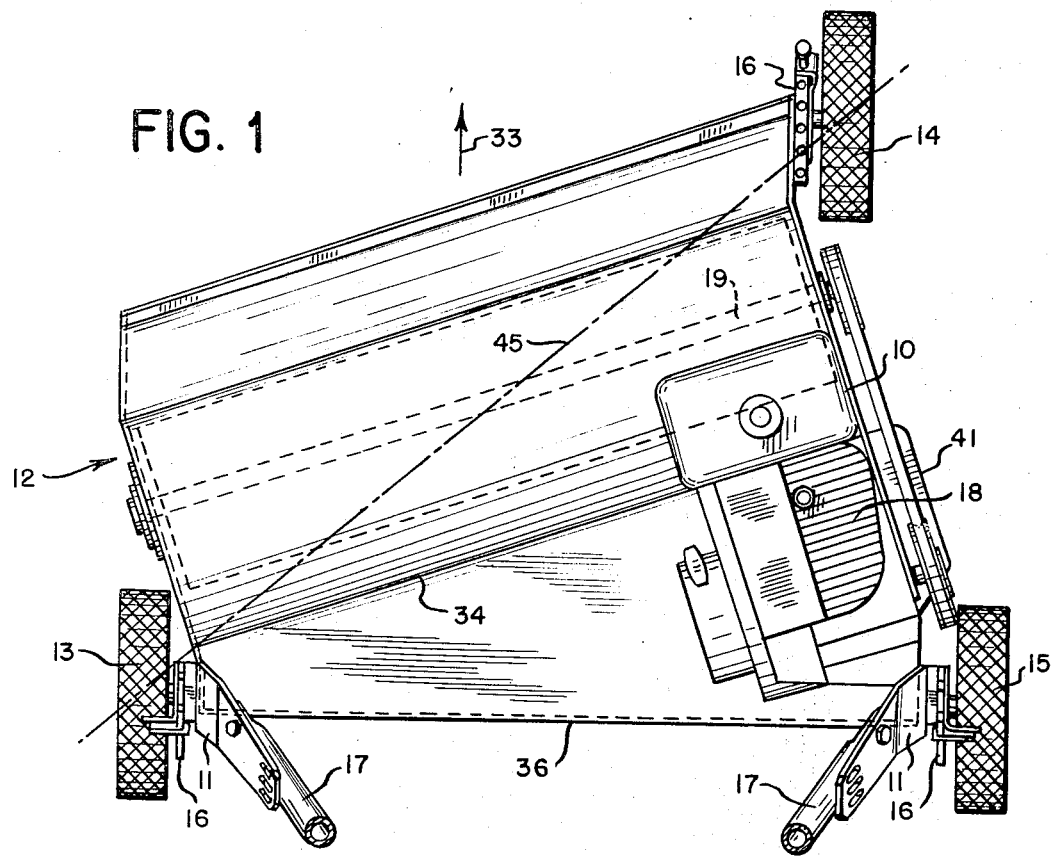
FIG. 1 is a top view of a mower in accordance with the present invention.

Referring to the drawings, the mower carriage includes side plate 10 and angle plates 11 attached to the housing generally designated as 12. Wheels 13, 14 and 15 are attached to the side and angle plates and conventional height adjusting fixtures 16 may be employed to permit adjusting the height of the cut. A handle partially indicated at 17 is attached to the carriage in desired manner. Motor 18 drives the axle 19 of the reel through a V-belt and pulley arrangement which need not be described in detail.

Figure 2:
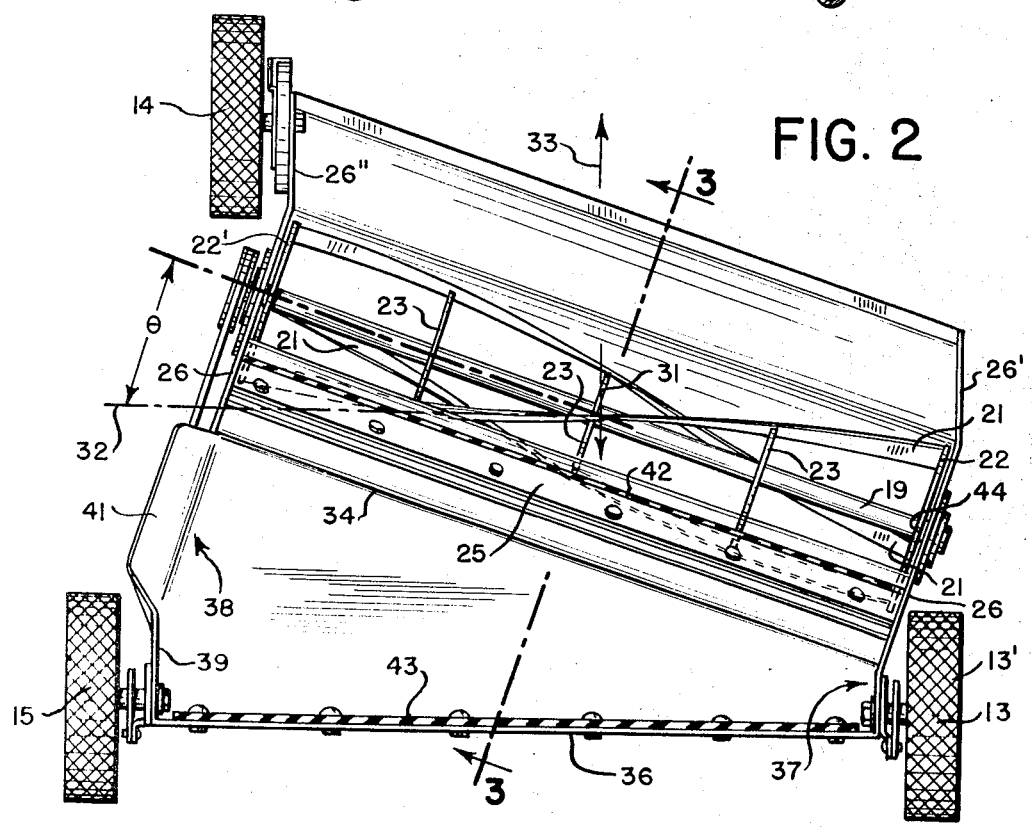
FIG. 2 is a bottom view of the mower.

As shown in FIG. 2, the reel has a plurality of helically-curved blades 21 spaced circumferentially around the reel. A reel with three blades is here shown, each blade being twisted through approximately 120°. The ends of the blades are attached to circular end plates 22, with intermediate support spiders 23 to provide a strong rigid structure.

Figure 3:
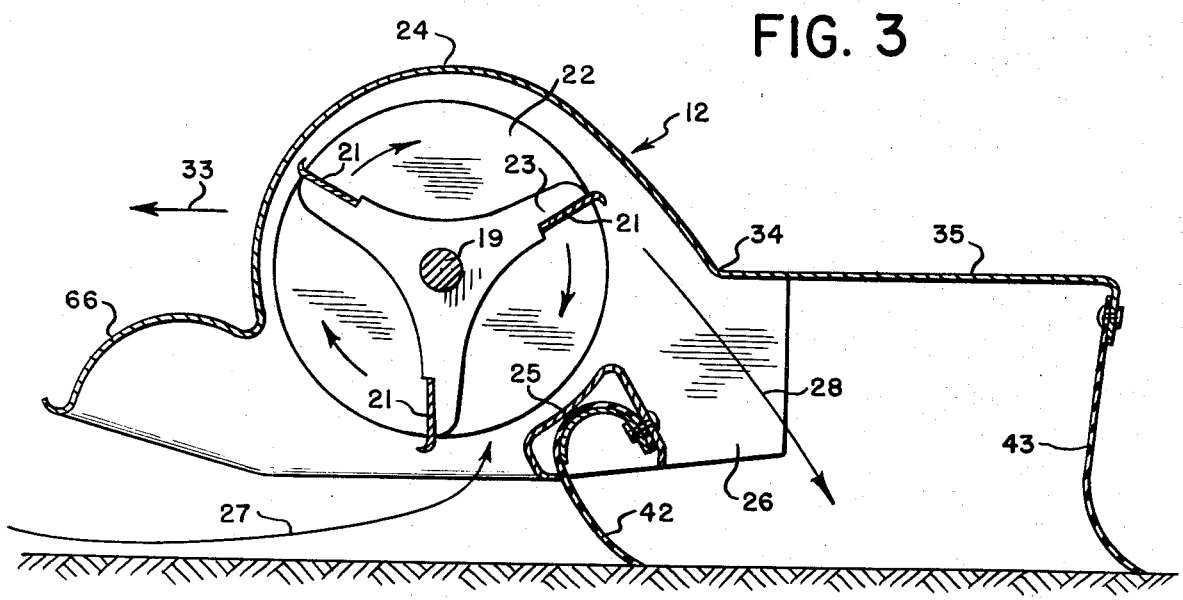
FIG. 3 is a cross-section taken along the line 3—3 of FIG. 2.

As shown in FIG. 3, the housing 12 comprises an upper sheet member 24, a lower member 25, and side plates 26 which form a blower conduit cooperating with the reel to form a cross-flow blower.

The operation of a mower of the cross-flow type is described in detail in the above-identified application, and need not be described here. The blower conduit shown in cross-section in FIG. 3 incorporates certain improvements over those described in the above-identified application, and is described and claimed in application Ser. No. 268,073, filed concurrently herewith by the same inventor. For present purposes it suffices to point out that air flows into the inlet region as generally indicated by arrow 27, and to the outlet region as generally indicated by arrow 28.

With helically-curved blades it has been found that air flows into the inlet region substantially perpendicularly to tangents to the blades in their lowermost positions, as indicated by arrow 31 in FIG. 2. As the reel rotates, successive portions of each blade will reach their lowermost position, and air flow will be perpendicular thereto as viewed in a horizontal plane.

In accordance with the present invention, the axis of rotation of the reel, here the axle 19, extends laterally of the carriage and horizontally, but is canted in the horizontal plane at an angle $\theta$ with respect to a perpendicular 32 to the normal direction of travel of the mower indicated by arrow 33. The direction of canting will depend on whether the helix blades are right-handed or left-handed and is selected such that tangents to the helix of the blades in the lowermost positions thereof, such as shown by line 32, are approximately perpendicular to the normal direction of travel of the mower. Although it is preferred to cant the reel such that angle θ is equal to the helix angle as shown, smaller angles may be employed if desired, and somewhat larger angles are possible.

The portions of the blower conduit adjacent the reel are also canted so as to maintain a proper cross-section for cross-flow blower action, such as shown in FIG. 3. Other specific cross-sections, such as shown in the aforesaid application Ser. No. 783,192, may be used if desired.

It is believed that the canting results in somewhat superior mowing, since the air flow forces the grass directly against the blades, rather than at an angle thereto, when the final cut is made. In addition, it is found that the self-cleaning action at end 26' of the forwardly extending section 66 of the housing is improved, since air flow to the reel is close to end 26' and parallel thereto, thereby preventing excessive build-up of grass in this region under ordinary mowing conditions. The functioning of section 66 is described in application Ser. No. 268,073, filed concurrently herewith.

As explained in application Ser. No. 268,073, filed concurrently herewith, it has been found desirable to bring the upper wall 24 of the blower conduit down behind the reel, with a gradually increasing separation therefrom, and then to introduce a sharp outward bend as at 34 to separate the adjacent layer of air from the conduit wall. This, among other factors, reduces the effect of subsequent portions of the discharge region on the blower performance. Thus greater latitude is allowed in designing the rear portion of the mower. Accordingly it has been found possible to orient the rear section 35 horizontally and taper it from one side to the other so that the trailing edge 36 is perpendicular to the direction of travel.

At the narrow side 37 (FIG. 2), the side member 26 may extend to the rear edge 36, and the rear portion bent outward to form a support for wheel 13. At the wide side 38, a sufficiently large opening is provided to allow air to escape without building up an excessive back pressure. On this side, side member 26 terminates somewhat behind the bend 34 and an angle bracket 39 is attached at the rear of the housing to support wheel 15, leaving the space therebetween open for outflow of air. A slightly downturned lip 41 directs the air outflow somewhat downward to avoid excessive side blast from the mower.

The motor 18 is mounted on the horizontal section 35, which is substantially below the top of the upper wall 24, thereby reducing the overall height of the mower.

The forwardly extending portions 26', 26" of the side walls 26 are angled with respect to the portions adjacent the reel ends so as to extend in substantially the normal direction of travel of the mower.

Wheel 13 is mounted behind the rearward end 22 of the canted reel, and at least partially laterally inside the lateral position of end 22. As shown, the outer side 13' of wheel 13 is approximately in alignment with portion 26' of the side wall, so that the mower can be brought close to walls, etc. on that side of the mower. Inasmuch as effective cutting can be obtained quite close to the ends of the blades in their lowermost position indicated as 44, effective cutting may be maintained fairly close to vertical walls or other obstacles.

Wheels 14 and 15 are mounted on the other side in respective forward and rearward positions. Dot-dash line 45 is drawn between the centers of wheels 13 and 14, and crosses the reel axis near the center thereof. Since the reel is supported generally within the points of contact of the three wheels with the ground, if one wheel rides higher or lower due to unevenness of the ground, the effect on the reel movement is somewhat reduced. Thus fairly even mowing of the grass when passing over somewhat uneven ground is promoted, while at the same time keeping the mower compact and economical to construct.

It will be understood that modifications of the specific embodiment may be made as meets the requirements of a particular application, and that selected features of the invention may be employed while omitting others if desired.

I claim:
1. A lawn mower comprising
   a. a carriage,
   b. a cylindrical reel rotatably mounted on said carriage with the axis thereof substantially horizontal and extending laterally of the carriage,
   c. said reel having a plurality of helically-curved circumferentially-spaced cutting blades which are narrow compared to the length thereof and are spaced from the reel axis to leave the major portion of the interior of the reel free for air flow through the reel transversely thereof,
   d. the cross-section of said blades having at least a portion on the leading side thereof which slopes backwardly and inwardly with respect to the direction of rotation of the reel,
   e. a blower conduit cooperating with said reel to form therewith a cross-flow blower,
   f. said conduit comprising upper and lower wall sections extending laterally along the length of the reel and having respective portions close to the reel at circumferentially spaced positions separating inlet and outlet regions of the blower,
   g. said inlet region opening downwardly with a portion of the reel therein exposed to material to be mowed,
   h. and motor means for driving said reel in a rotational direction such that the lower blades move in the normally forward direction of travel of the mower,
   i. the portions of the mowing machine adjacent the reel being non-shearingly spaced from the path of travel of said blades,
   wherein the improvement comprises
   j. said reel being mounted on said carriage with the axis thereof and the adjacent portions of said blower conduit canted in the horizontal plane at an angle with respect to a perpendicular to the normal direction of travel of the mower which is approximately equal to the helix angle of said helically-curved blades and in a direction such that tangents to the helix of said helically-curved blades in the lowermost positions thereof are approximately perpendicular to the normal direction of travel of the mower.

2. A mower in accordance with claim 1 in which said blower conduit has side sections closely adjacent the ends of said reel, respectively, and a forwardly projecting extension, the sides of said forwardly projecting extension being angled with respect to the side sections adjacent the reel ends to extend in substantially the normal direction of travel of the mower.

3. A mower in accordance with claim 1 in which said carriage is provided with three wheels, one of said wheels being mounted on one side of the carriage behind the rearward end of the canted reel and at least partially laterally inside the lateral position of said rearward end of the reel, the other two of said wheels being mounted in forward and rearward positions on the other side of said carriage.

4. A mower in accordance with claim 2 in which said carriage is provided with three wheels, one of said wheels being mounted on one side of the carriage behind the rearward end of the canted reel with the lateral position of the outside of the wheel approximately the same or less than the lateral position of the corresponding side of said forwardly projecting extension, the other two of said wheels being mounted in forward and rearward positions on the other side of said carriage.

5. A mower in accordance with claim 3 in which said one wheel and the forward wheel on said other side of the carriage are mounted so that a line extending between the centers of the wheels crosses the reel axis near the center thereof as viewed from the top of the mower.

6. A mower in accordance with claim 1 in which said blower conduit has side sections closely adjacent the ends of said reel, respectively, and a forwardly projecting extension, at least the side of said forwardly projecting extension ahead of the rearward end of the canted reel being angled to extend in substantially the normal direction of travel of the mower.

* * * * *